Oct. 27, 1959
S. W. LEMING
2,909,861
FISHING LINE RETRIEVER
Filed June 25, 1956
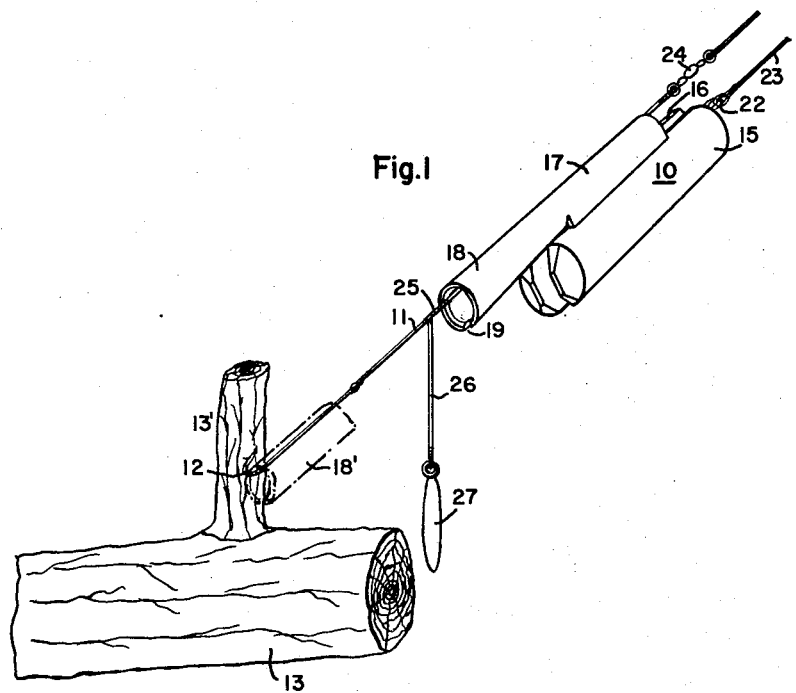
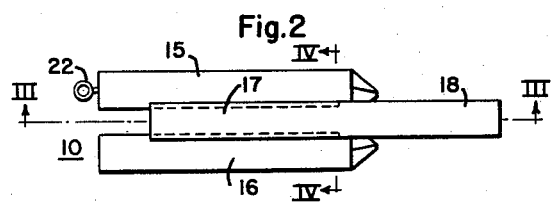
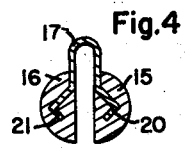
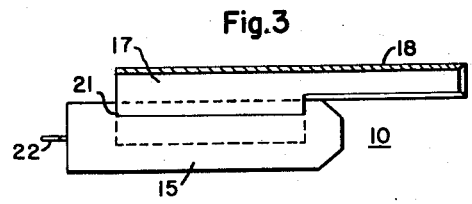
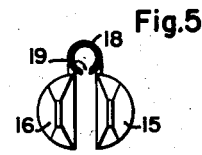
INVENTOR
Samuel W. Leming
BY
Francis U.B. Giolma
ATTORNEY

2,909,861

FISHING LINE RETRIEVER

Samuel W. Leming, Snow Hill, Ky.

Application June 25, 1956, Serial No. 593,650

1 Claim. (Cl. 43—17.2)

My invention relates generally to fishing tackle and it has reference in particular to a fishing line retriever for desnagging a snagged fish hook, plug, or other type of fishing lure.

One object of my invention is to provide a fishing line retriever that is simple and inexpensive to manufacture, and is easy to use and reliable in operation.

Another object of my invention is to provide a desnagger for fishing lines that can be readily placed on and removed from a snagged fishing line.

Yet another object of my invention is to provide a fishing line desnagger utilizing a saddle structure which is easily placed on the snagged line.

An important object of my invention is to provide in a retriever for a snagged fishing line, for using an open saddle structure connecting spaced weights, so as to permit the retriever to be easily placed on the line.

Yet another important object of my invention is to provide in a fishing line retriever for using spaced weights connected by an open saddle member having a forwardly projecting nose for engaging a snagged hook to strike it a freeing blow.

It is also an object of my invention to provide a fishing line retriever that will save many snagged hooks and lures that would otherwise be lost.

In practising my invention in accordance with one of its embodiments the retriever or desnagger comprises a pair of weights connected by an open saddle member which is simply dropped over the snagged line, and has a forwardly projecting nose. The retriever is allowed to slide down the snagged line, which is pulled taut. The nose fits rather closely around the line, and strikes the snagged hook a harp blow to free it. A line is attached to the retriever so that it may be drawn back up the line to strike further blows in the event that one is not sufficient to free the hook. This line can be used to retrieve the desnagger after the hook is freed.

For a more complete understanding of the nature and scope of my invention, reference may be made to the following detailed description, which may be read in connection with the accompanying drawing in which:

Fig. 1 is a perspective view showing how the desnagger is used;

Fig. 2 is an enlarged plan view of the desnagger;

Fig. 3 is a sectional view taken along line III—III of Fig. 2;

Fig. 4 is a sectional view taken along line IV—IV of Fig. 2; and

Fig. 5 is a front elevational view of the desnagger of Fig. 2.

Referring to Fig. 1 the reference numeral 10 designates generally a fishing line retriever or desnagger which is disposed to be placed on a snagged fishing line 11 having a hook 12 which has become snagged in a branch 13' of a sunken tree or log 13, for the purpose of striking the hook 12 a freeing blow or blows, as may be necessary to remove it from the branch.

The desnagger 10 comprises, as shown in Figures 1 through 5, a pair of elongated weights or body members 15 and 16, which are disposed in spaced apart side-by-side relation, and are connected by a central saddle member 17. The saddle member 17 has a body portion with a substantially U-shaped cross-section, the bight of which provides a groove to receive the fishing line. Depending leg portions 20 and 21 on either side of the bight are secured in the weights 15 and 16, respectively. The leg portions may, for example, be deformed or corrugated along the lower edges, and have the weights 15 and 16 cast thereabout, they being of lead or the like. The body portion 17 has a forwardly projecting nose 18 which is formed substantially cylindrically, to fit more or less closely around the line 11, having sufficient clearance to clear a swivel 25 or the like. A slot 19 is left between the adjacent edges of the nose 18 to permit the retriever to be readily slipped over the line. An eye 22 is secured to the rear of the retriever for attaching a retrieving line 23 thereto. The front ends of the weights 15 and 16 are tapered to permit more rapid movement of the retriever along the line 11.

In operation, the retriever 10 is slipped onto the line 11 which is held taut, with the weights 15 and 16 on opposite sides of the line, and the saddle 17 riding the line. This permits the retriever to slide rapidly down line 11 past swivel 24, swivel 25, and line 26 by which sinker 27 is attached. The projecting nose 18 strikes the hook 12 a sharp blow as shown by the dotted outline 18', in a direction to free it from the branch 13'. The retriever 10 may be retrieved by being pulled back by line 23. In the event that the first blow is not sufficient to free hook 12, the retriever 10 may be pulled back a few feet and released for a second blow. The saddle 17 readily passes swivels and other lines without impeding movement of the retriever.

From the above description and the accompanying drawing it will be apparent that I have provided a retriever that is simple and inexpensive to build, and is reliable and effective in use. It may be readily slipped on a snagged line, effectively frees snagged hooks, and is easily retrieved.

Since certain changes may be made in the above-described construction, and different embodiments of the invention may be made without departing from the scope and spirit of the invention, it is intended that all the matter contained in the above description and shown in the accompanying drawing shall be considered as illustrative and not in a limiting sense.

I claim as my invention:

A desnagger comprising, an elongated saddle having a U-shaped bight portion with depending sides and an integral substantially tubular projection at the bight extending forward of said bight a distance equal substantially to the length of the sides, said projection being provided with a slot on the side opposite the bight, and a pair of weights secured to said sides spaced from and below the tubular projection.

References Cited in the file of this patent

UNITED STATES PATENTS

| 893,173 | Kunze | July 14, 1908 |
| 2,534,790 | Moore | Dec. 19, 1950 |
| 2,553,173 | Consolo et al. | May 15, 1951 |
| 2,586,073 | McKee | Feb. 19, 1952 |
| 2,597,229 | Cox | May 20, 1952 |